United States Patent [19]

Canova

[11] 4,123,873
[45] Nov. 7, 1978

[54] CELLULAR STRUCTURE FOR THE CULTIVATION OF PLANTS

[76] Inventor: Roland Canova, 55, rue Rabelais, Lyon, Rhône, France, 3

[21] Appl. No.: 789,256

[22] Filed: Apr. 20, 1977

[51] Int. Cl.² ............................................... A01G 9/02
[52] U.S. Cl. ............................................ 47/83; 47/26
[58] Field of Search ...................... 47/82–83, 47/66

[56] References Cited

U.S. PATENT DOCUMENTS

| | | | |
|---|---|---|---|
| 440,141 | 11/1890 | Dearborn | 47/83 X |
| 1,740,057 | 12/1929 | Babich | 47/83 |
| 1,993,631 | 3/1935 | Smith | 47/83 X |
| 2,651,143 | 9/1953 | Esmay et al. | 47/82 X |
| 3,394,495 | 7/1968 | Mills | 47/83 |

FOREIGN PATENT DOCUMENTS

| | | | |
|---|---|---|---|
| 717,320 | 2/1942 | Fed. Rep. of Germany | 47/83 |
| 231,444 | 6/1944 | Switzerland | 47/82 |

*Primary Examiner*—Robert E. Bagwill
*Attorney, Agent, or Firm*—Karl F. Ross

[57] ABSTRACT

A cellular structure for the growth of plants (horticulture) has at least one planar wall inclined to the horizontal and the vertical and provided at its upwardly facing side with a multiplicity of openings for receiving respective plants. Each opening forms the mouth of a respective cell or pocket defined by the upper part of an outwardly projecting surface and the lower part of an inwardly projecting surface of the respective side. Several such walls can constitute an enclosure for a plant-growth medium, e.g. soil, into which the roots of the plants grow.

3 Claims, 4 Drawing Figures

CELLULAR STRUCTURE FOR THE CULTIVATION OF PLANTS

FIELD OF THE INVENTION

The present invention relates to a cellular structure for horticulture and, more particular, to a unit for the growth of plants in small areas of the cellular or pocketed type.

BACKGROUND OF THE INVENTION

In horticulture, i.e. the cultivation of flowering plants, leaf plants or vegetables, problems are encountered when the available growth area is limited. In practice, it is necessary to space the individual plants sufficiently with respect to the nutritive medium, i.e. the soil, to permit unimpeded root growth and a minimum of conflict between the roots of the plants for optimum growth.

The problem is especially pronounced in hothouse or enclosed cultivation of plants since, in this case, the heating of large areas creates problems with respect to energy cost and hence the cost per plant unit. It is, therefore, desirable to be able to cultivate a large number of plants in a given soil area or ground area since this reduces the cost per unit of plants for heating and hence the economy of such horticulture.

It has been proposed, for these reasons, to carry out plant culture on inclined planes. This has not been satisfactory heretofore since the pocketing of the ground or the terracing thereof by conventional techniques results in a compacting of the roots of the lower plants so that the latter tend to develop poorly. In addition, the roots of the adjacent plants tend to interfere with one another, again precluding optimum germination and growth.

It also may be mentioned that strawberry jars and like units have been provided heretofore with respective pockets, each receiving a plant, the jars being filled with a growth medium, e.g. soil or an artificial medium containing peat moss, soil, sand, perlite or vermiculite and the like. Such systems have also proved to be less than fully satisfactory because of the cost of the strawberry jar and because the units are incapable of providing a sufficient number of plants in a relatively small area.

OBJECTS OF THE INVENTION

It is, therefore, the principal object of the present invention to provide a structure which obviates the disadvantages of the earlier systems and increases the number of plants which can be cultivated over a given area of ground.

Still another object of the invention is to provide an inexpensive structure capable of providing for the growth of an optimum number of plants in a limited area and facilitating the access of light, air and moisture to the plants.

It is yet another object of the invention to provide an improved device for the multiple growth and propagation of plants which substantially restricts interference of the root system of the individual plants.

SUMMARY OF THE INVENTION

These objects and others which will become apparent hereinafter are attained, in accordance with the present invention, by providing a cellular structure, for the growth of plants (horticulture) which has at least one wall inclined to the horizontal and to the vertical and which is provided at its upwardly facing side with a multiplicity of openings for receiving respective plants. Each opening forms the mouth of a respective cell or pocket defined by the upper part of an outwardly projecting surface and the lower part of an inwardly projecting surface of the respective side. Several such walls can be assembled together or can form part of a unitary structure which can constitute an enclosure for a plant-growth medium, e.g. soil or an artificial medium as described above.

The structure is filled with soil or some other growth medium and each of the cells or pockets, delimited by the aforementioned surfaces, serves to receive a respective plant. Because the cells are disposed at different levels, preferably in a staggered relationship, each plant avails itself of a volume of soil sufficient to provide the necessary nutrition and permit optimum root growth without compacting or interference between the root systems of the plants of each row of cells or the plants of the superposed rows, the cells of the superposed rows being offset from one another.

I have found, most surprisingly, that the surfaces delimiting the respective cells or pockets appear to preclude the interaction between the root systems of adjacent plants and also prevent compacting of the soil even at the lowest levels of the enclosure or structure so that the lowermost plants do not suffer from compaction problems.

Moreover, the watering of the plants, which can be effected by sprinkling water on the upwardly inclined and upwardly turned surfaces of the structure, is greatly facilitated and there is little danger of overwatering plants in selected pockets.

Because the structure lies above the ground and contains a mass of soil or growth medium which is relatively small, the entire structure can be heated rapidly under solar radiation, thereby accelerating the germination and growth of the plants.

The structure of the present invention also has the advantage that the setting up of the structure and the work connected with horticulture using the same is simplified because all the work can be carried out above ground level.

The unit according to the invention may be employed wherever the available growth surface is limited and wherever ground culture is unfavorable or the soil is insufficiently arable to provide the necessary nutrients for plant growth. It can be used where the terrain is inclined too steeply for effective horticulture on the ground or wherever erosion may pose significant problems.

Furthermore, the device of the present invention is sufficiently versatile to enable it to be used in ornamental gardens, terraces or other cultivation sites in order to provide massive floral arrangements.

Advantageously, the upper boundary of the surface projecting toward the exterior is disposed above the lower boundary of the surface projecting toward the interior of each cell or pocket of the device of the present invention. In a preferred embodiment of my invention, the surface projecting toward the exterior is constituted by a segment of a conic section whose apex is turned downwardly while the surface projecting toward the interior is constituted by a conic section whose apex is turned upwardly. The lower conic section hence is convex outwardly while the upper conical section is concave outwardly.

It will be apparent that an enclosure employing the structure of the present invention can have different configurations, depending upon esthetic and spatial consideration. For example, it may be formed as a truncated pyramid, by a surface inclined to a fixed wall or the like. The structure may be formed from diverse materials, such as metal sheets, fibrocement (i.e. fiber-reinforced concrete or asbestos cement board) or synthetic-resin sheets. The entire structure may be monolithic or constituted by a plurality of detachable and separable elements or can be assembled permanently or temporarily from such elements.

I prefer, where the structure is to be disposed directly upon the soil, i.e. the ground, to provide the interior of the structure free from a floor or bottom. However, where the structure is of smaller size and is adapted to be utilized in an apartment or home interior, I have found it advantageous to provide it with a floor or bottom to ensure retention of the growth medium within the structure and prevent leakage of water therefrom.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
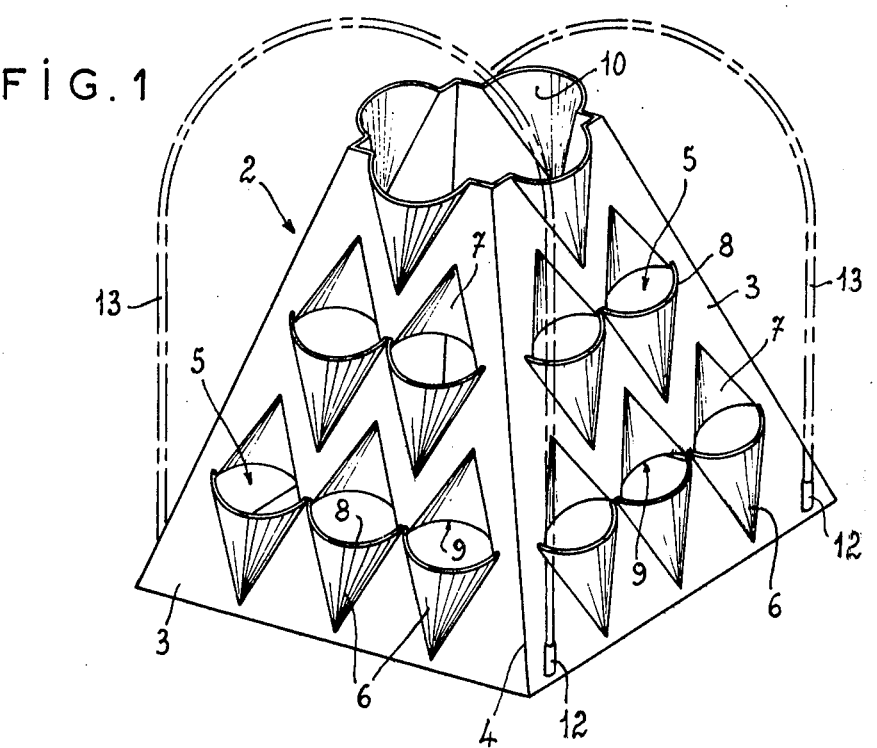
FIG. 1 is a perspective view of a device in accordance with a first embodiment of the present invention.

The two structures 2 shown in the drawing are each constituted in the form of a truncated pyramid and consist of four identical structural elements 3 assembled in pairs along their edges 4.

As can be seen especially from FIG. 1, each element 3 consists of sheet material and comprises a multiplicity of openings or mouths 5, each of which is deliminated by the upper part of the surface 6 constituted by a conic section whose apex is turned downwardly, the surfaces 6 being outwardly convex and projecting toward the exterior with respect to the element 3. Each of the mouths 5 of the respective cells or pockets is also delimited by the lower part of a surface 7 which is inwardly convex and hence projects toward the interior of the structure while being constituted as a conic section geometrically congruent to the surfaces 6 but having its apex turned upwardly.

Figure 4:
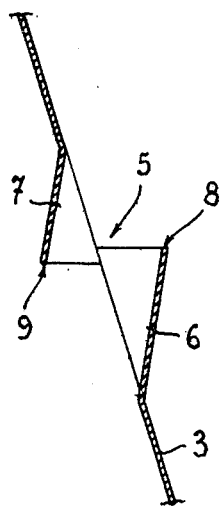
FIG. 4 is a section taken in a vertical plane through one of the pockets of the embodiment of FIG. 1 or FIG. 2 in accordance with the present invention.
Figure 2:
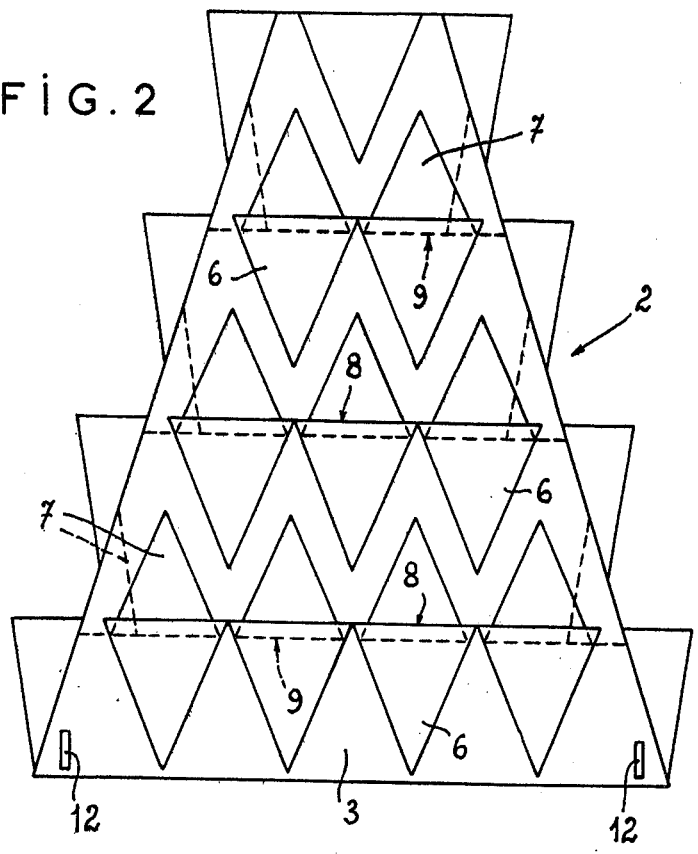
FIG. 2 is a side elevational view of a structure having a greater number of cells or pockets in accordance with a second embodiment of the invention.
Figure 3:
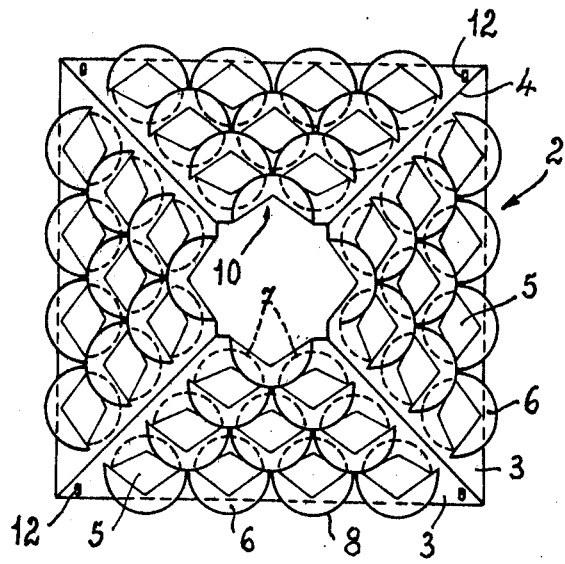
FIG. 3 is a top plan view of the structure of FIG. 2.

Associated formations 6 and 7 are bisected by a vertical median planes generally as shown in FIG. 4 which constitutes a section along such a vertical median plane passing perpendicular to wall element 3 through the axes of the two juxtaposed conic sections.

The two conic sections 6 and 7 of each mouth 5 thus define a cell or pocket (FIG. 4) adapted to receive a respective plant. The dimensions of these cells or pockets are, of course, a function of the nature of the plant to be cultivated therein. The drawing also shows that formations 6 and 7 are downwardly and upwardly converging cone segments with nearly vertical parallel generatrices in their common median plane. Because of this orientation, the upwardly open ends of the lower cone segments 6 are not overhung by the higher cone segments.

It can be seen that the upper boundary of the outer conic sections or cone segments 6 is disposed above the lower boundary of the associated relatively inverted inner cone segment 7, an arrangement which I have found to be highly effective to maintain the soil at the level of each cell. Hence, the soil which is introduced into the interior of the structure through the top thereof does not tend to emerge through the mouths 5.

The cells 10 which are formed at the top of the structure 2 are each deliminated only by a single surface constituted by an upwardly open cone segment 6.

Two opposite faces of the structure 2, at their lower parts, are provided with tubular sockets 12 in which bows 13 shown in dot-dash lines can be received, the bows 13 forming supports for a foil of transparent synthetic-resin material which can cover the structure 2 to form a small greenhouse therefrom. This arrangement I have found to be particularly effective where climatic conditions are unfavorable to retain heat, to shield the plants from excess heat or, in general, to protect the plants while they are growing. Naturally, the protective covering can be removed when the plants are fully developed or when it is desired to expose them to direct sunlight.

The pockets or cells of the structure are, as shown in the drawing, arrayed in horizontal rows in staggered relationship, i.e. the pockets of each row above the lower row are horizontally offset from the row therebelow. This I have found to provide maximum separation of the root systems.

As noted, the structure can be provided with a floor or can be internally opened downwardly if it is to be placed directly upon the soil of the ground.

Naturally, the invention is not limited to the embodiments illustrated and described, by way of example, and will be understood to encompass all of the variants within the scope of the appended claims. For example, the structure can have configurations different from that shown, can have a larger or smaller number of cells, may be formed monolithically or can be assembled by attaching the walls together, and the surfaces defining the cells or pockets can have different shapes within the limits discussed.

I claim:

1. A cellular structure for the cultivation of plants in a growth medium, comprising a generally frustopyramidal upwardly open enclosure with upwardly converging wall elements of sheet material, each of said wall elements being formed with an array of plant-receiving pockets closely juxtaposed in several rows including a top row at an upper wall edge and a plurality of lower rows, the number of pockets increasing by one from any upper row to the next-lower one, the pockets by adjoining rows being relatively staggered, each of said pockets including an outwardly bulging upwardly open formation, each pocket of any row other than said top row further including a downwardly open inwardly bulging formation above said outwardly bulging formation, any outwardly bulging formation of a higher row being set back sufficiently to avoid overhanging corresponding formations of a lower row, said outwardly and inwardly bulging formations are of cone-segmental shape, are bisected by a common median plane perpendicular to the respective wall element, and have parallel and nearly vertical overlapping generatrices in said plane, the upper surface of the outwardly bulging formation being disposed above the lower surface of the inwardly bulging formation.

2. A structure as defined in claim 1 wherein said top row is provided with only a single pocket.

3. A structure as defined in claim 1 wherein the number of said wall elements is four.

* * * * *